(12) United States Patent
Leone et al.

(10) Patent No.: US 11,725,562 B2
(45) Date of Patent: Aug. 15, 2023

(54) SYSTEMS AND METHODS FOR HOT AIR INJECTION INTO EXHAUST PORTS

(71) Applicant: Ford Global Technologies, LLC, Dearborn, MI (US)

(72) Inventors: Thomas Leone, Ypsilanti, MI (US); Brad Alan VanDerWege, Plymouth, MI (US); Peter C. Moilanen, Ann Arbor, MI (US); Xiaogang Zhang, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 347 days.

(21) Appl. No.: 17/093,446

(22) Filed: Nov. 9, 2020

(65) Prior Publication Data

US 2022/0145790 A1 May 12, 2022

(51) Int. Cl.
| | |
|---|---|
| *F01N 3/22* | (2006.01) |
| *F02D 41/02* | (2006.01) |
| *F02D 13/02* | (2006.01) |
| *F01N 3/30* | (2006.01) |
| *F01N 3/32* | (2006.01) |

(52) U.S. Cl.
CPC .............. *F01N 3/22* (2013.01); *F01N 3/306* (2013.01); *F01N 3/32* (2013.01); *F02D 13/0246* (2013.01); *F02D 41/025* (2013.01); *F01N 2900/0601* (2013.01); *F01N 2900/1402* (2013.01); *F01N 2900/1404* (2013.01); *F02D 2200/0802* (2013.01)

(58) Field of Classification Search
CPC ... F01N 1/14; F01N 3/306; F01N 3/22; F01N 3/34; F01N 3/32; F02D 41/025
USPC ......... 60/274, 287, 289, 291, 300, 303–307, 60/317
See application file for complete search history.

(56) References Cited

U.S. PATENT DOCUMENTS

| | | | |
|---|---|---|---|
| 5,136,842 A | | 8/1992 | Achleitner et al. |
| 5,417,059 A | | 5/1995 | Hartel et al. |
| 5,493,858 A | * | 2/1996 | Hosoya .................... F01N 3/306 60/284 |
| 5,666,804 A | * | 9/1997 | Sekiya .................... F01N 3/222 219/205 |
| 5,832,725 A | * | 11/1998 | Sim .......................... F01N 3/22 60/289 |

(Continued)

FOREIGN PATENT DOCUMENTS

EP    1180583 A2    2/2002

OTHER PUBLICATIONS

Leone, T. et al., "Systems and Methods for Split Lambda Catalyst Heating," U.S. Appl. No. 16/933,122, filed Jul. 20, 2020, 61 pages.

*Primary Examiner* — Mickey H France
(74) *Attorney, Agent, or Firm* — Vincent Mastrogiacomo; McCoy Russell LLP

(57) ABSTRACT

Methods and systems are provided for reducing emissions during an engine cold start. In one example, a method may include, during emission control device heating, injecting heated air into an exhaust runner of each cylinder of the engine during an exhaust stroke of the corresponding cylinder, after a blowdown exhaust pulse. In this way, an amount of hydrocarbons in feedgas provided to the emission control device prior to the emission control device reaching its light-off temperature may be reduced.

18 Claims, 6 Drawing Sheets

(56) References Cited

U.S. PATENT DOCUMENTS

| | | | |
|---|---|---|---|
| 7,792,627 B1 * | 9/2010 | Santoso | B60K 6/48 |
| | | | 60/303 |
| 9,238,983 B2 | 1/2016 | Zhang et al. | |
| 2004/0107693 A1 | 6/2004 | Bayerle et al. | |
| 2007/0079604 A1 * | 4/2007 | Macaluso | F01N 3/30 |
| | | | 60/306 |
| 2019/0055905 A1 * | 2/2019 | Dudar | F02D 41/004 |

* cited by examiner

SYSTEMS AND METHODS FOR HOT AIR INJECTION INTO EXHAUST PORTS

FIELD

The present description relates generally to methods and systems for a secondary air introduction system for an internal combustion engine.

BACKGROUND/SUMMARY

Exhaust emission control devices, such as catalytic converters (also referred to herein as "catalysts"), achieve higher emission reduction after reaching a predetermined operating temperature (e.g., a light-off temperature). Thus, to lower vehicle emissions, various methods attempt to raise emission control device temperature as fast as possible. For example, catalysts are currently placed as close to the engine as possible to minimize heat losses and catalyst warm-up time after an engine cold start. However, it is desired to move catalysts further downstream from the engine to reduce catalyst degradation during peak power, as it may not possible to use enrichment to control exhaust temperature in the future due to "lambda one" emissions regulations. This may increase an amount of time before the catalyst reaches its light-off temperature. Therefore, new solutions are needed to simultaneously warm up the catalyst quickly and minimize hydrocarbon emissions during warm-up, even if the catalyst is located further downstream from the engine.

Other attempts to reduce hydrocarbon emissions during warm-up include introducing secondary air into the exhaust upstream of an emission control device while operating with a rich air-fuel ratio. One example approach is shown by Zhang et al. in U.S. Pat. No. 9,238,983 B2. Therein, boosted air from downstream of a compressor is delivered into a wastegate duct coupled across a turbine, upstream of an emission control device, and exothermically reacted with unburnt fuel in the exhaust to create an exothermic reaction that will heat the emission control device.

However, the inventors herein have recognized potential issues with such systems. As one example, boosted air may be unavailable immediately following engine start, when hydrocarbon emissions may be greatest. As another example, the boosted air may have a cooling effect on the exhaust, which may increase an amount of time before the emission control device reaches its light-off temperature. As still another example, operating with a rich air-fuel ratio may reduce vehicle fuel economy.

In one example, the issues described above may be addressed by a method, comprising: during heating of a catalyst coupled in an exhaust system of an engine, injecting heated air into an exhaust runner of each cylinder of the engine after a blowdown exhaust pulse of the corresponding cylinder. In this way, the heated air may react with unburnt hydrocarbons sitting in the exhaust runner following the blowdown exhaust pulse, thereby reducing an amount of unburnt hydrocarbons that are delivered to the catalyst during warm-up.

As one example, during the heating of the catalyst, the engine may be operated at approximately stoichiometry, such as at stoichiometry or a small percentage (e.g., no more than 2%) richer than stoichiometry. As a result, a hydrocarbon output of the engine may be lower than when traditional cold start enrichment strategies are used. As an example, injecting the heated air into the exhaust runner of each cylinder after the blowdown exhaust pulse of the corresponding cylinder may include opening a flow control valve after the blowdown exhaust pulse for a duration determined based on an estimated amount of hydrocarbons in the exhaust runner. For example, the flow control valve may be positioned in a delivery passage between an air injector coupled to the exhaust runner and an air pump, and thus, opening the flow control valve may enable the air pump to deliver pressurized air to the air injector. Further, the heated air may be heated by one or more heating elements positioned downstream of the air pump. For example, the one or more heating elements may include a centralized air heater positioned to heat the pressurized air provided to every air injector and/or heating elements positioned within each air injector.

By injecting the heated air directly into the exhaust runner, the engine may be operated at or near stoichiometry during the heating, which increases fuel economy and reduces vehicle emissions. Further, the heated air does not have a cooling effect on the exhaust. As a result, the catalyst may reach its light-off temperature faster than when the air is not heated. Further, the flow control valves may enable air to be selectively injected during a desired portion of each cylinder's combustion cycle. As a result, excess air will not be delivered to the catalyst. Overall, both vehicle emissions prior to the catalyst reaching its light-off temperature and an amount of time before the catalyst reaches its light-off temperature may be reduced.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 3:
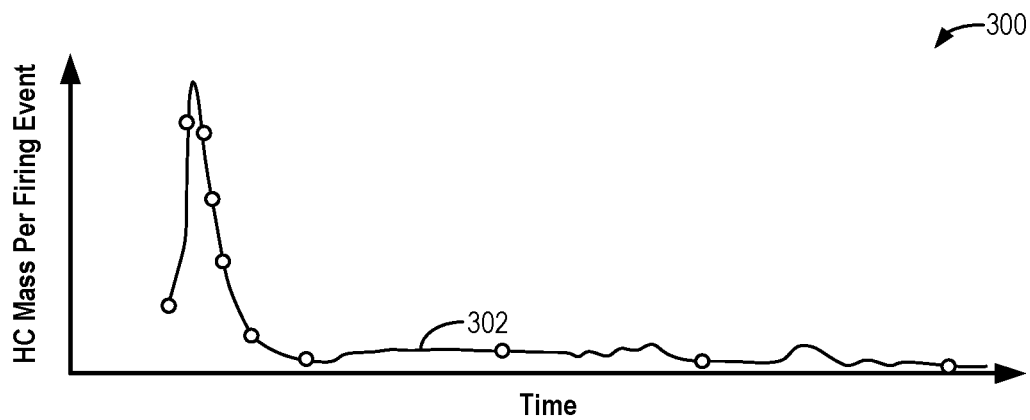
FIG. 3 shows an example graph of a mass of hydrocarbons output by an engine during each firing event of an engine start.
Figure 4:
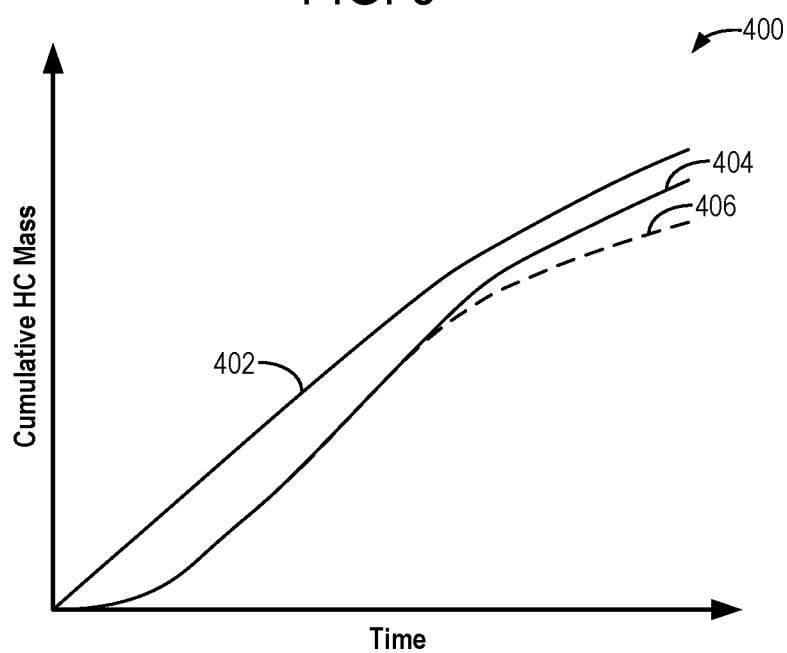
FIG. 4 shows an example graph of a cumulative hydrocarbon mass immediately following an engine start.
Figure 6:
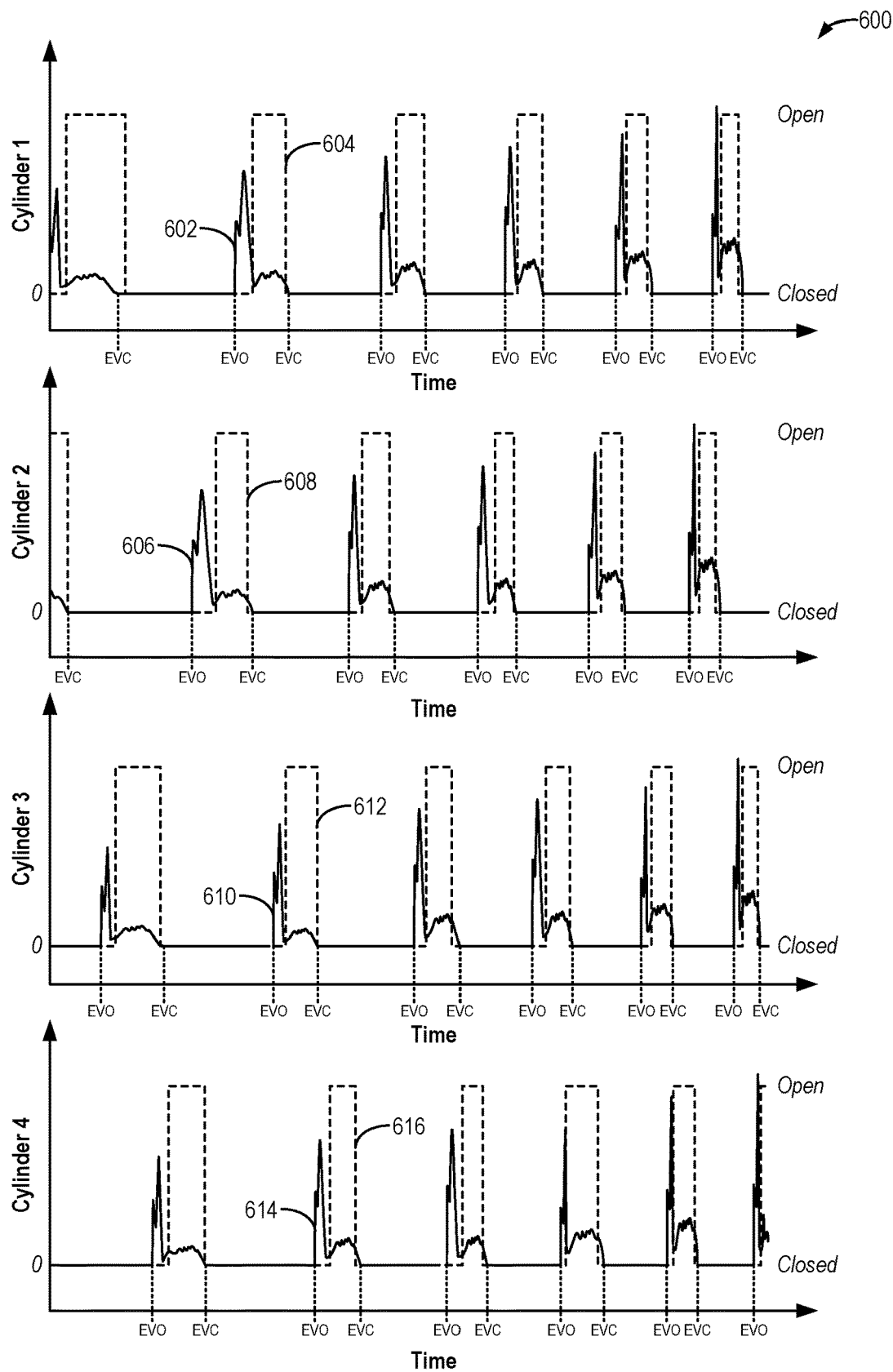
FIG. 6 shows a set of graphs demonstrating sequential locations and timings of heated air injection into exhaust runners of an engine.
Figure 7:
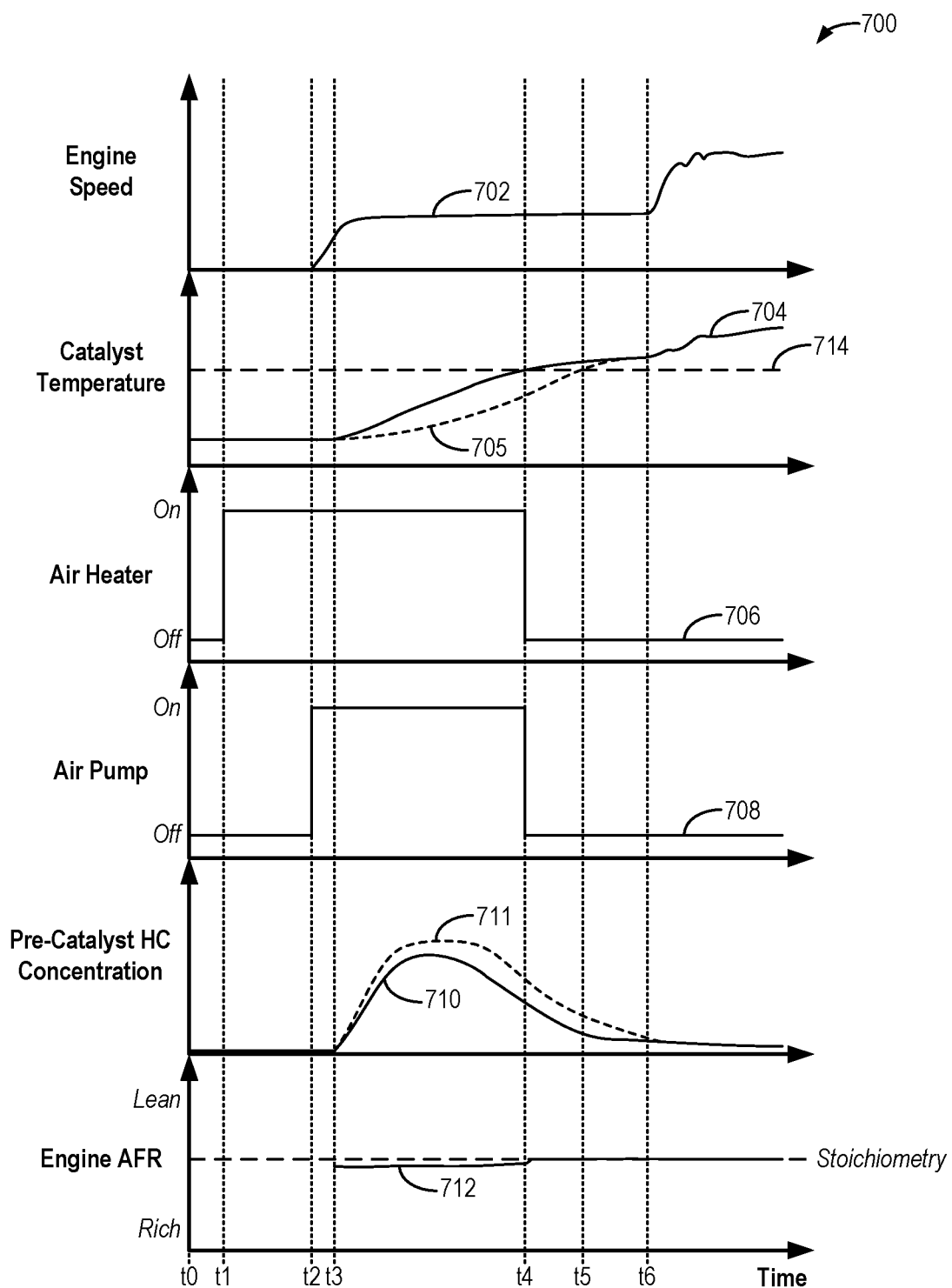
FIG. 7 shows an example timeline of operating a secondary air injection system during an engine cold start.

The following description relates to systems and methods for reducing exhaust emissions during an engine start. The engine may be the engine schematically shown in FIGS. 1 and 2, for example, including the secondary air injection system of FIG. 2. For example, the secondary air injection system may be used to inject hot air into exhaust ports of the engine while a hydrocarbon output of the engine is relatively high, as depicted in FIGS. 3 and 4, and prior to an emission control device (e.g., catalyst) reaching its light-off temperature, at which the emission control device can effectively treat the hydrocarbon output of the engine. The hot air may react with the hydrocarbons within the exhaust ports, before the hydrocarbons are delivered to the emission control device. The hot air injection may be performed sequentially following a blowdown pulse during an exhaust stroke of the corresponding cylinder, such as depicted in FIG. 6 and according to the control method of FIG. 5. Further, the engine may be operated approximately at stoichiometry to further reduce the hydrocarbon output of the engine. An example timeline for operating the secondary air injection system during an engine cold start is shown in FIG. 7.

Figure 1:
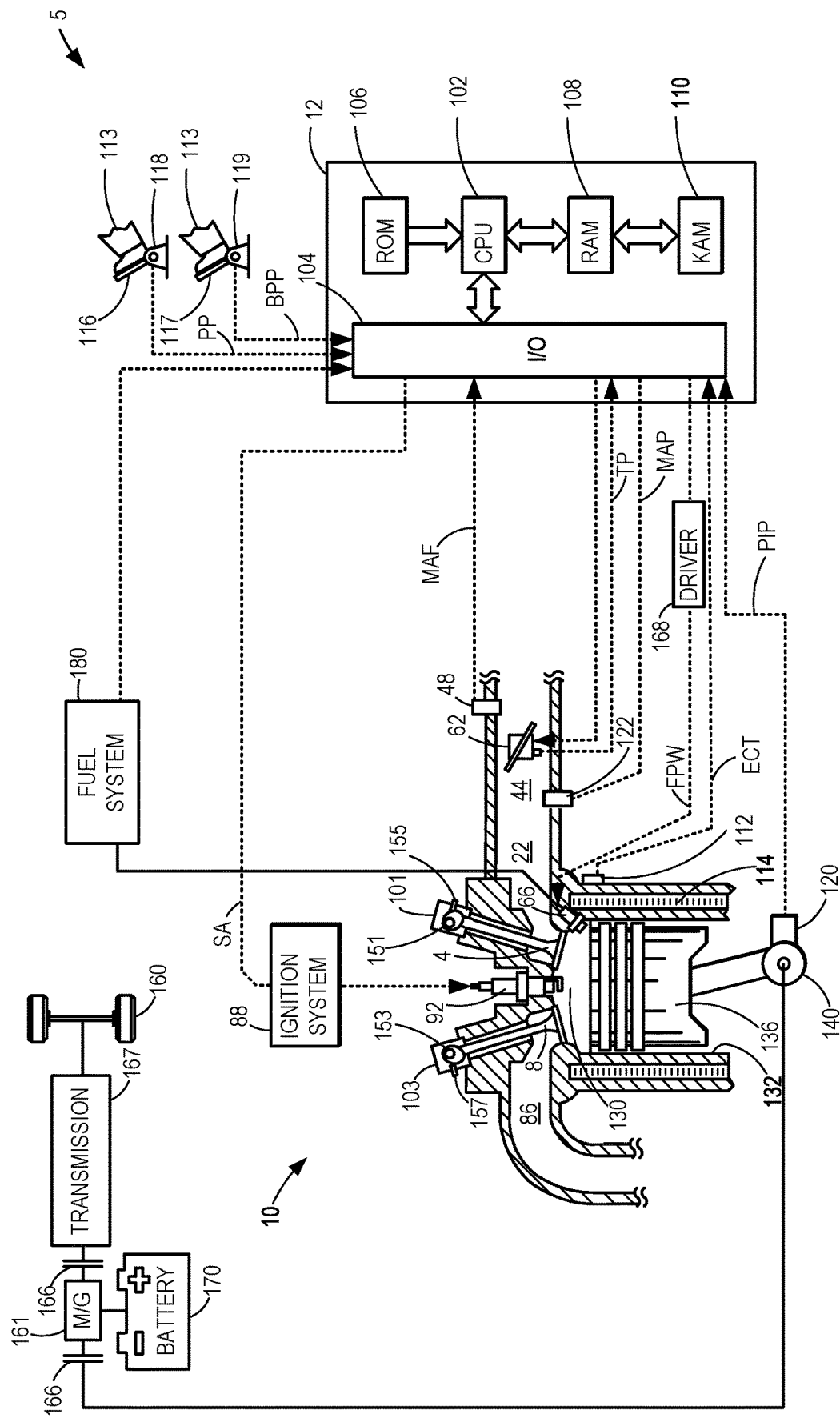
FIG. 1 shows an embodiment of a cylinder that may be included in an engine system.

Turning now to the figures, FIG. 1 shows a partial view of a single cylinder 130 of an internal combustion engine 10 that may be included in a vehicle 5. Internal combustion engine 10 may be a multi-cylinder engine, one example configuration of which will be described below with respect to FIG. 2. Cylinder (e.g., combustion chamber) 130 includes a coolant sleeve 114 and cylinder walls 132, with a piston 136 positioned therein and connected to a crankshaft 140. Combustion chamber 130 is shown communicating with an intake manifold 44 via an intake valve 4 and an intake port 22 and with an exhaust port 86 via exhaust valve 8.

In the depicted view, intake valve 4 and exhaust valve 8 are located at an upper region of combustion chamber 130. Intake valve 4 and exhaust valve 8 may be controlled by a controller 12 using respective cam actuation systems including one or more cams. The cam actuation systems may utilize one or more of cam profile switching (CPS), variable cam timing (VCT), variable valve timing (VVT), and/or variable valve lift (VVL) systems to vary valve operation. In the depicted example, intake valve 4 is controlled by an intake cam 151, and exhaust valve 8 is controlled by an exhaust cam 153. The intake cam 151 may be actuated via an intake valve timing actuator 101, and the exhaust cam 153 may be actuated via an exhaust valve timing actuator 103 according to set intake and exhaust valve timings, respectively. In some examples, intake valve 4 and exhaust valve 8 may be deactivated via the intake valve timing actuator 101 and exhaust valve timing actuator 103, respectively. For example, the controller may send a signal to the exhaust valve timing actuator 103 to deactivate exhaust valve 8 such that it remains closed and does not open at its set timing. The position of intake cam 151 and exhaust cam 153 may be determined by camshaft position sensors 155 and 157, respectively.

In some examples, the intake and/or exhaust valve may be controlled by electric valve actuation. For example, cylinder 130 may alternatively include an intake valve controlled via electric valve actuation and an exhaust valve controlled via cam actuation, including CPS and/or VCT systems. In still other examples, the intake and exhaust valves may be controlled by a common valve actuator or actuation system or a variable valve timing actuator or actuation system.

Cylinder 130 can have a compression ratio, which is a ratio of volumes when piston 136 is at bottom dead center to top dead center. Conventionally, the compression ratio is in a range of 9:1 to 10:1. However, in some examples where different fuels are used, the compression ratio may be increased. This may happen, for example, when higher octane fuels or fuels with higher latent enthalpy of vaporization are used. The compression ratio may also be increased if direct injection is used due to its effect on engine knock.

In some examples, each cylinder of engine 10 may include a spark plug 92 for initiating combustion. An ignition system 88 can provide an ignition spark to combustion chamber 130 via spark plug 92 in response to a spark advance signal SA from controller 12, under select operating modes. However, in some examples, spark plug 92 may be omitted, such as where engine 10 initiates combustion by auto-ignition or by injection of fuel, such as when engine 10 is a diesel engine.

As a non-limiting example, cylinder 130 is shown including one fuel injector 66. Fuel injector 66 is shown coupled directly to combustion chamber 130 for injecting fuel directly therein in proportion to a pulse-width of a signal FPW received from controller 12 via an electronic driver 168. In this manner, fuel injector 66 provides what is known as direct injection (hereafter also referred to as "DI") of fuel into cylinder 130. While FIG. 1 shows injector 66 as a side injector, it may also be located overhead of the piston, such as near the position of spark plug 92. Such a position may increase mixing and combustion when operating the engine with an alcohol-based fuel due to the lower volatility of some alcohol-based fuels. Alternatively, the injector may be located overhead and near the intake valve to increase mixing. In another example, injector 66 may be a port injector providing fuel into the intake port upstream of cylinder 130.

Fuel may be delivered to fuel injector 66 from a high pressure fuel system 180 including one or more fuel tanks, fuel pumps, and a fuel rail. Alternatively, fuel may be delivered by a single stage fuel pump at a lower pressure. Further, while not shown, the fuel tanks may include a pressure transducer providing a signal to controller 12. Fuel tanks in fuel system 180 may hold fuel with different fuel qualities, such as different fuel compositions. These differences may include different alcohol content, different octane, different heats of vaporization, different fuel blends, and/or combinations thereof, etc. In some examples, fuel system 180 may be coupled to a fuel vapor recovery system including a canister for storing refueling and diurnal fuel vapors. The fuel vapors may be purged from the canister to the engine cylinders during engine operation when purge conditions are met.

Engine 10 may be controlled at least partially by controller 12 and by input from a vehicle operator 113 via an accelerator pedal 116 and an accelerator pedal position sensor 118 and via a brake pedal 117 and a brake pedal position sensor 119. The accelerator pedal position sensor 118 may send a pedal position signal (PP) to controller 12 corresponding to a position of accelerator pedal 116, and the brake pedal position sensor 119 may send a brake pedal position (BPP) signal to controller 12 corresponding to a position of brake pedal 117. Controller 12 is shown in FIG. 1 as a microcomputer, including a microprocessor unit 102, input/output ports 104, an electronic storage medium for executable programs and calibration values shown as a read-only memory 106 in this particular example, random access memory 108, keep alive memory 110, and a data bus. Storage medium read-only memory 106 can be programmed with computer readable data representing instructions executable by microprocessor 102 for performing the methods and routines described herein as well as other variants that are anticipated but not specifically listed. Controller 12 may receive various signals from sensors coupled to engine 10, in addition to those signals previously discussed, including a measurement of inducted mass air flow (MAF) from mass air flow sensor 48, an engine coolant temperature signal (ECT) from a temperature sensor 112 coupled to coolant sleeve 114, a profile ignition pickup signal (PIP) from a Hall effect sensor 120 (or other type) coupled to crankshaft 140, a throttle position (TP) from a throttle position sensor coupled to a throttle 62, and an absolute manifold pressure signal (MAP) from a MAP sensor 122 coupled to intake manifold 44. An engine speed signal, RPM, may be generated by controller 12 from signal PIP. The manifold pressure signal MAP from the manifold pressure sensor may be used to provide an indication of vacuum or pressure in the intake manifold.

Based on input from one or more of the above-mentioned sensors, controller 12 may adjust one or more actuators, such as fuel injector 66, throttle 62, spark plug 92, the intake/exhaust valves and cams, etc. The controller may receive input data from the various sensors, process the input data, and trigger the actuators in response to the processed input data based on instruction or code programmed therein corresponding to one or more routines, an example of which is described with respect to FIG. 5.

In some examples, vehicle 5 may be a hybrid vehicle with multiple sources of torque available to one or more vehicle wheels 160. In other examples, vehicle 5 is a conventional vehicle with only an engine. In the example shown in FIG. 1, the vehicle includes engine 10 and an electric machine 161. Electric machine 161 may be a motor or a motor/generator and thus may also be referred to herein as an electric motor. Electric machine 161 receives electrical power from a traction battery 170 to provide torque to vehicle wheels 160. Electric machine 161 may also be operated as a generator to provide electrical power to charge battery 170, for example, during a braking operation.

Crankshaft 140 of engine 10 and electric machine 161 are connected via a transmission 167 to vehicle wheels 160 when one or more clutches 166 are engaged. In the depicted example, a first clutch 166 is provided between crankshaft 140 and electric machine 161, and a second clutch 166 is provided between electric machine 161 and transmission 167. Controller 12 may send a signal to an actuator of each clutch 166 to engage or disengage the clutch, so as to connect or disconnect crankshaft 140 from electric machine 161 and the components connected thereto, and/or connect or disconnect electric machine 161 from transmission 167 and the components connected thereto. Transmission 167 may be a gearbox, a planetary gear system, or another type of transmission. The powertrain may be configured in various manners including as a parallel, a series, or a series-parallel hybrid vehicle.

Figure 2:
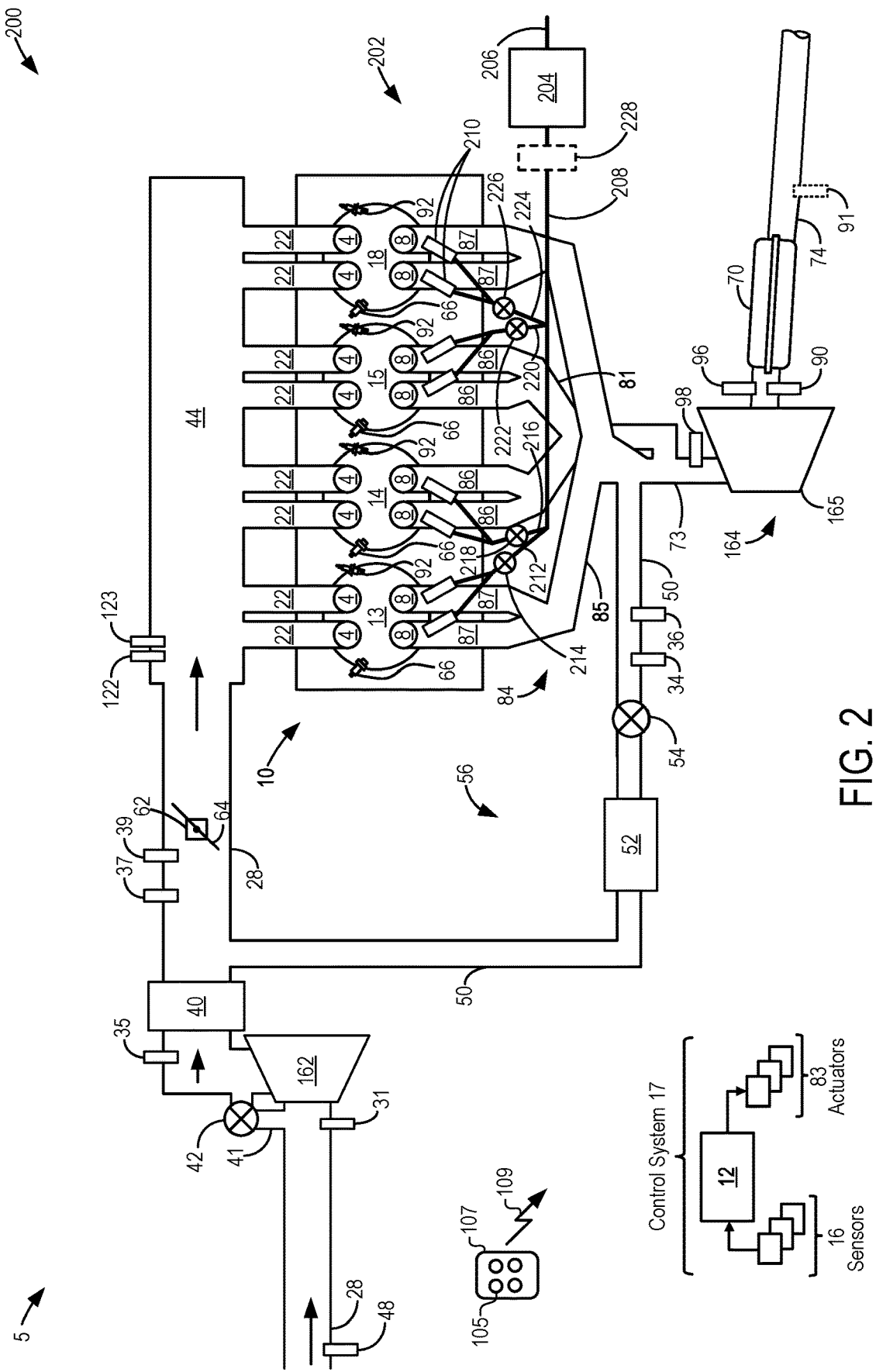
FIG. 2 shows a schematic depiction of an example of an engine system.

Referring now to FIG. 2, a schematic diagram of an example engine system 200 is shown, which may be included in the propulsion system of vehicle 5 of FIG. 1. For example, engine system 200 provides one example engine configuration of engine 10 introduced in FIG. 1. As such, components previously introduced in FIG. 1 are represented with the same reference numbers and are not re-introduced. Further, some of the components introduced in FIG. 1 are not shown in FIG. 2, although they may be present. In the example shown in FIG. 2, engine 10 includes cylinders 13, 14, 15, and 18, arranged in an inline-4 configuration, although other engine configurations are also possible (e.g., I-3, V-4, I-6, V-8, V-12, opposed 4, and other engine types). Thus, the number of cylinders and the arrangement of the cylinders may be changed without parting from the scope of this disclosure. The engine cylinders may be capped on the top by a cylinder head. Cylinders 14 and 15 are referred to herein as the inner (or inside) cylinders, and cylinders 13 and 18 are referred to herein as the outer (or outside) cylinders. The cylinders shown in FIG. 2 may each have a cylinder configuration, such as the cylinder configuration described above with respect to FIG. 1.

In the example shown, each of cylinders 13, 14, 15, and 18 includes two intake valves 4 and two exhaust valves 8. The intake and exhaust valves may be referred to herein as cylinder intake valves and cylinder exhaust valves, respectively. As explained above with reference to FIG. 1, a timing (e.g., opening timing, closing timing, opening duration, etc.) of each intake valve 4 and each exhaust valve 8 may be controlled via various valve timing systems.

Each cylinder receives intake air (or a mixture of intake air and recirculated exhaust gas, as will be elaborated below) from intake manifold 44 via an air intake passage 28. Intake manifold 44 is coupled to the cylinders via intake ports (e.g., runners) 22. In this way, each cylinder intake port can selectively communicate with the cylinder it is coupled to via a corresponding intake valve 4. Each intake port may supply air, recirculated exhaust gas, and/or fuel to the cylinder it is coupled to for combustion.

As described above with respect to FIG. 1, a high pressure fuel system may be used to generate fuel pressures at the fuel injector 66 coupled to each cylinder. For example, controller 12 may inject fuel into each cylinder at a different timing such that fuel is delivered to each cylinder at an appropriate time in an engine cycle. As used herein, "engine cycle" refers to a period during which each engine cylinder fires once in a designated cylinder firing order. A distributorless ignition system may provide an ignition spark to cylinders 13, 14, 15, and 18 via the corresponding spark plug 92 in response to the signal SA from controller 12 to initiate combustion. A timing of the ignition spark may be individually adjusted for each cylinder or for a group of cylinders, at least in some examples.

Inside cylinders 14 and 15 are each coupled to an exhaust port (e.g., runner) 86 and outside cylinders 13 and 18 are each coupled to an exhaust port 87 for channeling combustion exhaust gases to an exhaust system 84. Each exhaust port 86 and 87 can selectively communicate with the cylinder it is coupled to via the corresponding exhaust valve 8. Specifically, as shown in FIG. 2, cylinders 14 and 15 channel exhaust gases to a first exhaust manifold 81 via exhaust ports 86, and cylinders 13 and 18 channel exhaust gases to a second exhaust manifold 85 via exhaust ports 87. In other examples, each cylinder may channel exhaust to a same exhaust manifold.

Engine system 200 further includes a turbocharger 164, including a turbine 165 and an intake compressor 162 coupled on a common shaft (not shown). In the example shown in FIG. 2, turbine 165 is fluidically coupled to first exhaust manifold 81 and second exhaust manifold 85 via a first exhaust passage 73. For example, first exhaust manifold 81 and second exhaust manifold 85 are each coupled to first exhaust passage 73 upstream of turbine 165. Turbine 165 may be a monoscroll turbine or a dual scroll turbine, for example. In examples where a dual scroll turbine is used, instead of merging upstream of turbine 165, first exhaust manifold 81 may deliver exhaust gas to a first scroll of the dual scroll turbine, and second exhaust manifold 85 may deliver exhaust gas to a second scroll of the dual scroll turbine.

Exhaust gas delivered to turbine 165 via first exhaust passage 73 drives rotation of turbine 165, which in turn drives rotation of compressor 162, disposed within intake passage 28. As such, the intake air becomes boosted (e.g., pressurized) at the compressor 162 and travels downstream to intake manifold 44. Exhaust gases exit turbine 165 into a second exhaust passage 74. In some examples, a wastegate may be coupled across turbine 165 (not shown). Specifically, a wastegate valve may be included in a bypass coupled between exhaust passage 73, upstream of an inlet of turbine 165, and exhaust passage 74, downstream of an outlet of turbine 165. The wastegate valve may control an amount of exhaust gas flowing through the bypass and to the outlet of turbine. For example, as an opening of the wastegate valve increases, an amount of exhaust gas flowing through the bypass and not through turbine 165 may increase, thereby decreasing an amount of power available for driving turbine 165 and compressor 162. As another example, as the opening of the wastegate valve decreases, the amount of exhaust gas flowing through the bypass decreases, thereby increasing the amount of power available for driving turbine 165 and compressor 162. In this way, a position of the wastegate valve may control an amount of boost provided by turbocharger 164. In other examples, turbine 165 may be a variable geometry turbine (VGT) including adjustable vanes to change an effective aspect ratio of turbine 165 as engine operating conditions change to provide a desired boost pressure. Thus, increasing the speed of turbocharger 164, such as by further closing the wastegate valve or adjusting turbine vanes, may increase the amount of boost provided, and decreasing the speed of turbocharger 164, such as by further opening the wastegate valve or adjusting the turbine vanes, may decrease the amount of boost provided.

Exhaust passage 73 further includes a first exhaust gas temperature (EGT) sensor 98. In the example shown in FIG. 2, first EGT sensor 98 is located upstream of turbine 165, such as near the inlet of turbine 165. As such, first EGT sensor 98 may be configured to measure a temperature of exhaust gases entering turbine 165. In some examples, an output of first EGT sensor 98 may be used by controller 12 to determine a turbine inlet temperature.

After exiting turbine 165, exhaust gases flow downstream in exhaust passage 74 to an emission control device 70. Emission control device 70 may include one or more emission control devices, such as one or more catalyst bricks and/or one or more particulate filters. For example, emission control device 70 may include a three-way catalyst configured to chemically reduce nitrogen oxides (NOx) and oxidize carbon monoxide (CO) and hydrocarbons (HC). In some examples, emission control device 70 may additionally or alternatively include a gasoline particulate filter (GPF). After passing through emission control device 70, exhaust gases may be directed out to a tailpipe. As an example, the three-way catalyst may be maximally effective at treating exhaust gas with a stoichiometric air-fuel ratio (AFR), as will be elaborated below.

Herein, the AFR will be discussed as a relative AFR, defined as a ratio of an actual AFR of a given mixture to stoichiometry and represented by lambda ($\lambda$). A lambda value of 1 occurs at stoichiometry (e.g., during stoichiometric operation), wherein the air-fuel mixture produces a complete combustion reaction. Therefore, controller 12 may determine a fuel pulse width to send to the fuel injector 66 of each cylinder based on an amount of air ingested by engine 10 in order to maintain the AFR at a lambda value of 1. For example, engine 10 may operate with stoichiometric fueling during nominal operation in order to decrease vehicle emissions. Nominal stoichiometric operation may include the AFR fluctuating about stoichiometry, such as by $\lambda$ generally remaining within 2% of stoichiometry. For example, engine 10 may transition from a rich lambda value that is less than 1 (where more fuel is provided than for a complete combustion reaction, resulting in excess, unburnt fuel) to a lean lambda value that is greater than 1 (where more air is provided than for a complete combustion reaction, resulting in excess, unburnt air) and from lean to rich between injection cycles, resulting in an "average" operation at stoichiometry.

Exhaust passage 74 further includes a plurality of exhaust sensors in electronic communication with controller 12, which is included in a control system 17. As shown in FIG. 2, second exhaust passage 74 includes a first oxygen sensor 90 positioned upstream of emission control device 70. First oxygen sensor 90 may be configured to measure an oxygen content of exhaust gas entering emission control device 70. Second exhaust passage 74 may include one or more additional oxygen sensors positioned along exhaust passage 74, such as a second oxygen sensor 91 positioned downstream of emission control device 70. As such, second oxygen sensor 91 may be configured to measure the oxygen content of the exhaust gas exiting emission control device 70. In one example, one or more of oxygen sensor 90 and oxygen sensor 91 may be a universal exhaust gas oxygen (UEGO) sensor. Alternatively, a two-state exhaust gas oxygen sensor may be substituted for at least one of oxygen sensors 90 and 91. Second exhaust passage 74 may include various other sensors, such as one or more temperature and/or pressure sensors. For example, as shown in FIG. 2, a second EGT sensor 96 is positioned within exhaust passage 74 upstream of emission control device 70. Second EGT sensor 96 may be configured to measure the temperature of exhaust gas entering emission control device 70. In some examples, the output of second EGT sensor 96 may be used to estimate a temperature of emission control device 70.

First exhaust passage 73 is coupled to an exhaust gas recirculation (EGR) passage 50 included in an EGR system 56. In the example shown in FIG. 2, EGR passage 50 is coupled to first exhaust passage 73 upstream of where first exhaust manifold 81 couples to first exhaust passage 73. As such, EGR passage 50 fluidically couples second exhaust manifold 85 to intake passage 28, downstream of compressor 162. Exhaust gases are directed from first exhaust passage 73 (e.g., particularly from second exhaust manifold 85) to air intake passage 28, downstream of compressor 162, via EGR passage 50, which provides high-pressure EGR. However, in other examples, EGR passage 50 may be coupled to intake passage 28 upstream of compressor 162. Further, in other examples, EGR passage 50 may be coupled to first exhaust passage 73 downstream of where first exhaust manifold 81 couples to first exhaust passage 73, resulting in exhaust gas from both first exhaust manifold 81 and second exhaust manifold 85 being provided to intake passage 28 via EGR passage 50.

As shown in FIG. 2, EGR passage 50 may include an EGR cooler 52 configured to cool exhaust gases flowing from first exhaust passage 73 to intake passage 28 and may further include an EGR valve 54 disposed therein. Controller 12 is configured to actuate and adjust a position of EGR valve 54 in order to control a flow rate and/or amount of exhaust gas flowing through EGR passage 50. When EGR valve 54 is in a closed (e.g., fully closed) position, no exhaust gas may flow from first exhaust passage 73 to intake passage 28. When EGR valve 54 is in an open position (e.g., from partially open to fully open), exhaust gas may flow from first exhaust passage 73 to intake passage 28. Controller 12 may adjust EGR valve 54 into a plurality of positions between fully open and fully closed. In other examples, controller 12 may adjust EGR valve 54 to be either fully open or fully closed. Further, in some examples, a pressure sensor 34 may be arranged in EGR passage 50 upstream of EGR valve 54.

As shown in FIG. 2, EGR passage 50 is coupled to intake passage 28 downstream of a charge air cooler (CAC) 40. CAC 40 is configured to cool intake air as it passes through CAC 40. In an alternative example, EGR passage 50 may be coupled to intake passage 28 upstream of CAC 40 (and downstream of compressor 162). In some such examples, EGR cooler 52 may not be included in EGR passage 50, as CAC cooler 40 may cool both the intake air and recirculated exhaust gases. EGR passage 50 may further include an oxygen sensor 36 disposed therein and configured to measure an oxygen content of exhaust gases flowing through EGR passage 50 from first exhaust passage 73. In some examples, EGR passage 50 may include additional sensors, such as temperature and/or humidity sensors, to determine a composition and/or quality of the exhaust gas being recirculated to intake passage 28 from exhaust manifold 85.

Intake passage 28 further includes throttle 62. As shown in FIG. 2, throttle 62 is positioned downstream of CAC 40 and downstream of where EGR passage 50 couples to intake passage 28 (e.g., downstream of a junction between EGR passage 50 and intake passage 28). A position of a throttle plate 64 of throttle 62 may be adjusted by controller 12 via a throttle actuator (not shown) communicatively coupled to controller 12. By modulating throttle 62 while operating compressor 162, a desired amount of fresh air and/or recirculated exhaust gas may be delivered to the engine cylinders at a boosted pressure via intake manifold 44.

To reduce compressor surge, at least a portion of the air charge compressed by compressor 162 may be recirculated to the compressor inlet. A compressor recirculation passage 41 may be provided for recirculating compressed air from a compressor outlet, upstream of CAC 40, to a compressor inlet. A compressor recirculation valve (CRV) 42 may be provided for adjusting an amount of flow recirculated to the compressor inlet. In one example, CRV 42 may be actuated open via a command from controller 12 in response to actual or expected compressor surge conditions.

Intake passage 28 may include one or more additional sensors (such as additional pressure, temperature, flow rate, and/or oxygen sensors). For example, as shown in FIG. 2, intake passage 28 includes MAF sensor 48 disposed upstream of compressor 162 in intake passage 28. An intake pressure and/or temperature sensor 31 is also positioned in intake passage 28 upstream of compressor 162. An intake oxygen sensor 35 may be located in intake passage 28 downstream of compressor 162 and upstream of CAC 40. An additional intake pressure sensor 37 may be positioned in intake passage 28 downstream of CAC 40 and upstream of throttle 62 (e.g., a throttle inlet pressure sensor). In some examples, as shown in FIG. 2, an additional intake oxygen sensor 39 may be positioned in intake passage 28 between CAC 40 and throttle 62, downstream of the junction between EGR passage 50 and intake passage 28. Further, MAP sensor 122 and an intake manifold temperature sensor 123 are shown positioned within intake manifold 44, upstream of the engine cylinders.

A greatest occurrence of hydrocarbon emissions may occur in the first few firing events after engine 10 is started. Turning briefly to FIG. 3, an example graph 300 of hydrocarbon mass per firing event (vertical axis) with respect to time (horizontal axis) is shown. Specifically, a plot 302 shows individual firing events of one cylinder of a multi-cylinder engine (e.g., engine 10 of FIGS. 1 and 2) as open circles. As shown by plot 302, the hydrocarbon mass per firing event peaks between the second and third firing events on the cylinder before steadily decreasing. However, the time period during which this peak occurs may also correspond to a time before an emission control device (e.g., emission control device 70) reaches its light-off temperature. As such, the emission control device may not be maximally effective at reducing the hydrocarbons output by the engine when the hydrocarbon output is the highest.

Therefore, returning to FIG. 2, engine system 200 further includes a secondary air injection system 202. Secondary air injection system 202 may be a ported electric thermactor air (PETA) system, for example, that is configured to directly inject air into exhaust ports 86 and 87. Secondary air injection system 202 includes a plurality of air injectors 210, with one air injector 210 coupled to each exhaust runner 86 and 87. In the example shown, air is delivered to each air injector 210 via a branched air passage system and an air pump 204. For example, air pump 204 receives air from an intake passage 206 and delivers pressurized air to a multi-cylinder air delivery passage 208. Air pump 204 may be operated at a fixed speed to provide air of a desired pressure to multi-cylinder air delivery passage 208. Multi-cylinder air delivery passage 208 branches into a plurality of cylinder air delivery passages to provide air to each cylinder. That is, each branch fluidically couples multi-cylinder air delivery passage 208 to one cylinder of engine 10. In the example shown, a first cylinder air delivery passage 212 provides air to air injectors 210 of cylinder 13, a second cylinder air delivery passage 216 provides air to air injectors 210 of cylinder 14, a third cylinder air delivery passage 220 provides air to air injectors 210 of cylinder 15, and a fourth cylinder air delivery passage 224 provides air to air injectors 210 of cylinder 18.

Each cylinder air delivery passage branches from multi-cylinder air delivery passage 208 and selectively provides secondary air to air injectors 210 of a single cylinder based on a position of a flow control valve positioned therein. In the example shown, first cylinder air delivery passage 212 includes a first flow control valve 214 disposed therein, upstream of where first cylinder air delivery passage 212 branches to provide air to each air injector 210 of cylinder 13. Similarly, second cylinder air delivery passage 216 includes a second flow control valve 218 disposed therein, upstream of where second cylinder air delivery passage 216 branches to provide air to each air injector 210 of cylinder 14, third cylinder air delivery passage 220 includes a third flow control valve 222 disposed therein, upstream of where third cylinder air delivery passage 220 branches to provide air to each air injector 210 of cylinder 15, and fourth cylinder air delivery passage 224 includes a fourth flow control valve 226 disposed therein, upstream of where fourth cylinder air delivery passage 224 branches to provide air to each air injector 210 of cylinder 18. Each flow control valve 214, 218, 222, and 226 may be individually adjusted (e.g., by controller 12) between a fully closed position, where air flow through the corresponding flow control valve (and to the corresponding air injector 210) is blocked, and a fully open position, where air flow through the corresponding flow control valve (and to the corresponding air injector 210) is enabled. In some examples, each flow control valve 214, 218, 222, and 226 may be adjusted to a plurality of positions between and including the fully open and fully closed positions. As will be elaborated herein with respect to FIGS. 5 and 6, each flow control valve may be selectively opened to enable secondary air injection into an exhaust port (or pair of exhaust ports for a single cylinder) when exhaust gas having a high hydrocarbon concentration is flowing through that exhaust port.

In some examples, a heater 228 is provided in multi-cylinder air delivery passage 208, upstream of the branching to the individual cylinder air delivery passages 212, 216, 220, and 224. Heater 228 may serve as a central heater that supplies heated air to all of the individual cylinder air delivery passages 212, 216, 220, and 224. Heater 228 may be an electric heater, for example. Further, heater 228 may be activated in anticipation that engine 10 will be started (e.g., prior to engine 10 being started), such as responsive to a door of vehicle 5 being opened, vehicle 5 being unlocked, or a proximity of a key fob 107, for example. Heater 228 may have a high surface area to increase the amount of heat transferred to air passing therethrough. For example, heating element(s) of heater 228 may have a honeycomb structure. Additionally or alternatively, each air injector 210 may include a heating element (or heater). For example, each air injector 210 may include an electric heating element that produces heat when supplied with electric current. As still another example, additionally or alternatively, additional heating elements (or heaters) may be positioned within each individual cylinder air delivery passage. As such, the hot air supplied to each cylinder by air injectors 210 may be heated by one or heating elements.

Secondary air injection system 202 may be used to simultaneously help warm up emission control device 70 and reduce hydrocarbon emissions during the warm-up. Referring briefly to FIG. 4, an example graph 400 shows a cumulative hydrocarbon mass (vertical axis) with respect to time (horizontal axis) immediately following an engine start. A plot 402 shows a cumulative hydrocarbon mass emitted by the engine with respect to time, a plot 404 shows a cumulative hydrocarbon mass in feedgas provided to an emission control device (e.g., emission control device 70 of FIG. 1) without secondary air injection, and a dashed plot 406 shows a cumulative hydrocarbon mass in the feedgas provided to the emission control device with secondary air injection. As shown by comparing plot 404 to dashed plot 406, providing the secondary air injection of heated air, such as via secondary air injection system 202 of FIG. 2, reduces the cumulative hydrocarbon mass in the feedgas provided to the emission control device.

Returning to FIG. 2, engine 10 may be controlled at least partially by control system 17, including controller 12, and by input from the vehicle operator (as described above with respect to FIG. 1). Control system 17 is shown receiving information from a plurality of sensors 16 (various examples of which are described herein) and sending control signals to a plurality of actuators 83. As one example, sensors 16 may include the pressure, temperature, and oxygen sensors located within intake passage 28, intake manifold 44, first exhaust passage 73, second exhaust passage 74, and EGR passage 50, as described above. Other sensors may include a throttle inlet temperature sensor for estimating a throttle air temperature (TCT) coupled upstream of throttle 62 in the intake passage. Further, it should be noted that engine 10 may include all or a portion of the sensors shown in FIG. 2. As another example, actuators 83 may include fuel injectors 66; air injectors 210; flow control valves 214, 218, 222, and 226; throttle 62; CRV 42; EGR valve 54; and spark plugs 92. Actuators 83 may further include various camshaft timing actuators coupled to the cylinder intake and exhaust valves (as described above with reference to FIG. 1). Controller 12 may receive input data from the various sensors, process the input data, and trigger the actuators in response to the processed input data based on instruction or code programmed in a memory of controller 12 corresponding to one or more routines. For example, controller 12 may control the opening and closing of each flow control valve 214, 218, 222, and 226 to control a flow (and flow rate) of heated air injected into the exhaust runners of each cylinder according to the example method (e.g., routine) of FIG. 5.

Furthermore, in some examples, control system 17 may be include a remote engine start receiver (or transceiver) that receives wireless signals 109 from key fob 107 having a remote start button 105. In other examples (not shown), a remote engine start may be initiated via a cellular telephone or a smartphone-based system where a user's telephone sends data to a server and the server communicates with vehicle 5 to start engine 10.

Figure 5:
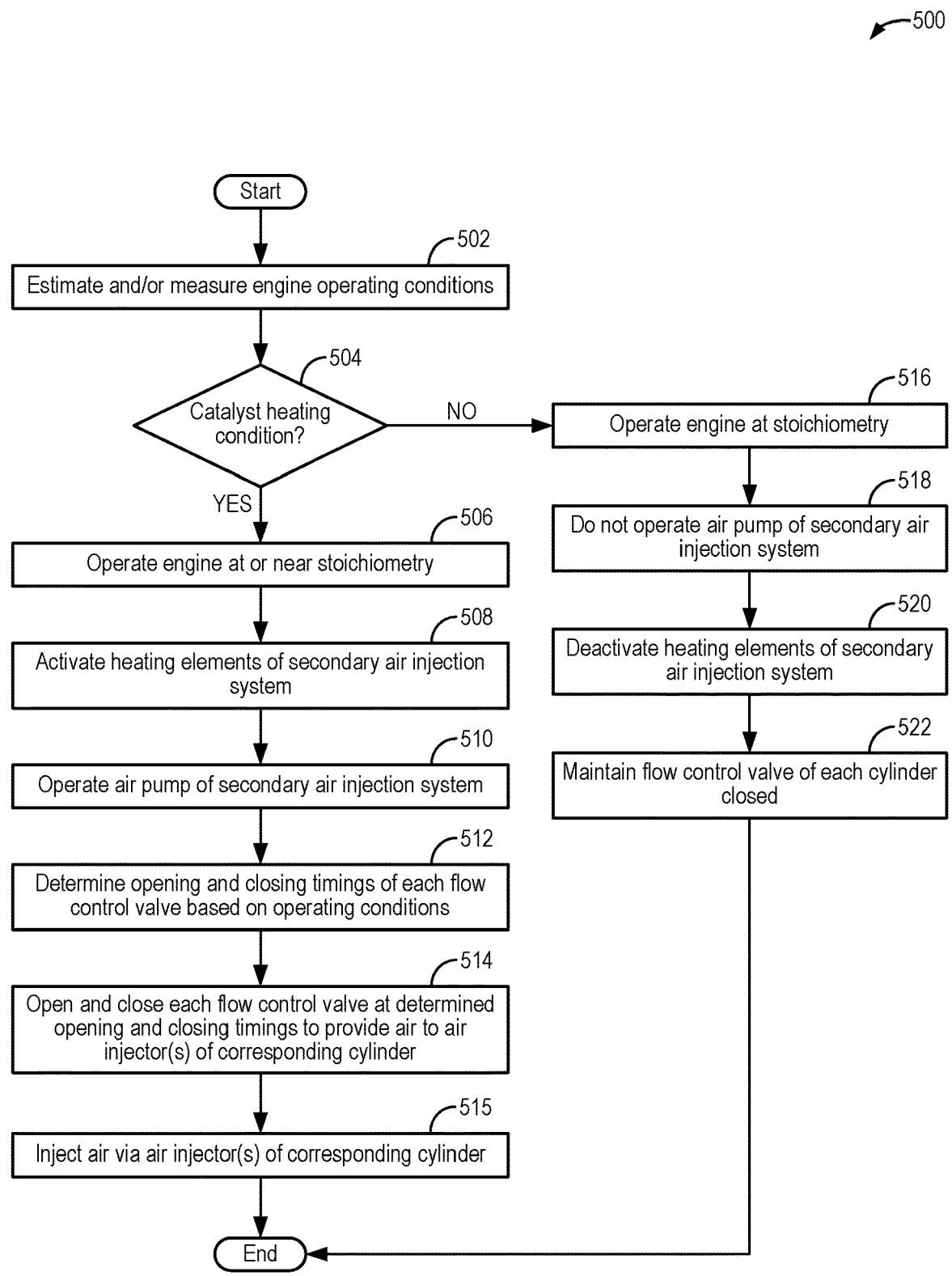
FIG. 5 is a flow chart of an example method for operating a secondary air injection system to provide sequential injections of hot air to exhaust runners of an engine during a cold start.

Turning now to FIG. 5, an example method 500 for injecting heated air into an exhaust system is shown. For example, the heated air may be heated and injected into exhaust ports via a secondary air injection system, such as secondary air injection system 202 of FIG. 2. Although method 500 will be described with respect to the engine system and components shown in FIGS. 1 and 2, method 500 may be applied to other engine systems without parting from the scope of this disclosure. Instructions for carrying out method 500 and the rest of the methods included herein may be executed by a controller (e.g., controller 12 of FIGS. 1 and 2) based on instructions stored on a memory of the controller and in conjunction with signals received from sensors of the engine system, such as the sensors described above with reference to FIGS. 1 and 2. The controller may employ engine actuators of the engine system to adjust engine operation, such as by operating flow control valves of the secondary air injection system (e.g., flow control valves 214, 218, 222, and 226 of FIG. 2), according to the methods described below.

At 502, method 500 includes estimating and/or measuring engine operating conditions. The engine operating conditions may include, for example, an engine speed, an intake manifold pressure (e.g., MAP), a mass air flow of intake air provided to the engine (e.g., MAF), an engine temperature, engine torque demand, a fuel injection amount and timing, cylinder valve lift and timing settings, an exhaust gas temperature, a commanded AFR, a measured AFR, a spark timing, etc. As one example, the exhaust gas temperature may be measured by the exhaust gas temperature sensor, such as second EGT sensor 96 of FIG. 1, and may be used to infer a temperature of a catalyst (e.g., emission control device 70 of FIG. 2). As another example, the measured AFR may be determined based on output from a UEGO sensor (e.g., first oxygen sensor 90 of FIG. 2). The intake manifold pressure may be measured by a MAP sensor, such as MAP sensor 122 of FIGS. 1 and 2, and the inducted mass air flow may be measured by a MAF sensor, such as MAF sensor 48 of FIGS. 1 and 2. As still another example, the engine temperature may be determined from an output of an engine coolant temperature sensor, such as ECT sensor 112 of FIG. 1.

At 504, it is determined if a catalyst heating condition is present. In one example, the catalyst heating condition may occur during a cold start. As an example, the cold start may be confirmed when the engine temperature is less than a first threshold temperature. The first threshold temperature may correspond to a non-zero, positive temperature value stored in a memory of the controller, above which the engine is considered to be warm and at a steady state operating temperature. As another example, the cold start may be confirmed when the engine temperature is substantially equal to the ambient temperature (e.g., within a threshold of the ambient temperature, such as within 10° C.) at engine start (e.g., when the engine cranked from zero speed to a non-zero speed, with fuel and spark provided to initiated combustion). As still another example, the cold start may be confirmed when the engine has been inactive for greater than a threshold duration, which may correspond to a non-zero amount of time (e.g., minutes, hours, or days) over which the engine is expected to cool to approximately ambient temperature.

Additionally or alternatively, the catalyst heating condition may be confirmed when the temperature of the catalyst is less than a desired operating temperature. As one example, the desired operating temperature may be a light-off temperature of the catalyst. The light-off temperature of the catalyst may be a predetermined, second threshold temperature stored in the memory of the controller at or above which a high catalytic efficiency is achieved, enabling the catalyst to effectively decrease vehicle emissions, for example. The catalyst may be below its light-off temperature when the engine temperature is less than the first threshold temperature, for example.

If the catalyst heating condition is present, method 500 proceeds to 506 and includes operating the engine at or near stoichiometry. For example, the engine may be operated at stoichiometry or just rich of stoichiometry, such as within a small percentage from stoichiometry (e.g., 0-2% richer than stoichiometry). The rich AFR used responsive to the cold start condition according to method 500 may be much less rich than that typically used during cold start in order to reduce (e.g., minimize) the quantity of unburned hydrocarbons which go to/through the catalyst before it is warmed up.

At 508, method 500 includes activating heating elements of the secondary air injection system. The secondary air injection system may have one or more heating elements, which may be electric heating elements that generate heat when powered. For example, the one or more heating elements may include a central air heater that heats all of the air supplied via secondary air injection system (e.g., heater 228 of FIG. 2), heating elements located at each individual air injector (e.g., air injectors 210), or other heaters positioned in air delivery passages of the secondary air injection system. In some examples, the heating elements may be activated responsive to the cold start condition being detect. In other examples, the heating elements may be activated before the cold start condition is detected, such as responsive to a vehicle door being opened or unlocked, detection of a key fob, or another indication that an engine start is imminent, as mentioned above with respect to FIG. 2. Further, the heating elements of the secondary air injection system may be configured to heat the air delivered via the air injection system at least a desired temperature. As one example, the desired temperature may be approximately 500° C. The desired temperature may be a pre-determined temperature that is calibrated to aid in, or at least not inhibit, heating of the downstream catalyst.

At 510, method 500 includes operating an air pump of the secondary air injection system. For example, the air pump (e.g., air pump 204) may include an electric motor and movable part (e.g., an impeller or piston) that drives the flow of air. Thus, operating the air pump may include supplying electrical power to the electric motor to drive the movable part and draw air into the secondary air injection system via an intake passage. In some examples, the air pump may be operated at a fixed speed to provide air of a desired pressure to an air delivery passage of the secondary air injection system.

At 512, method 500 includes determining opening and closing timings of each flow control valve of the secondary air injection system based on the operating conditions (e.g., as measured at 502). Each flow control valve may be used to control an amount of air delivered to exhaust runner(s) of one cylinder of the engine as well as the timing of the delivery. For example, because the air pump may be operated at a fixed speed, adjusting a duration of opening the corresponding flow control valve may vary the amount of air delivered to the exhaust runner(s) of a particular cylinder. Using a four-cylinder engine as an example, a first flow control valve (e.g., first flow control valve 214 of FIG. 2) may control air flow from the secondary air injection system to exhaust runner(s) of a first cylinder, a second flow control valve (e.g., second flow control valve 218 of FIG. 2) may control air flow from the secondary air injection system to exhaust runner(s) of a second cylinder, a third flow control valve (e.g., third flow control valve 222 of FIG. 2) may control air flow from the secondary air injection system to exhaust runner(s) of a third cylinder, and a fourth flow control valve (e.g., fourth flow control valve 226 of FIG. 2) may control air flow from the secondary air injection system to exhaust runner(s) of a fourth cylinder.

Late in the exhaust stroke, after exhaust blowdown, exhaust gas containing a high hydrocarbon concentration (evaporated from piston wetting) slowly moves into the exhaust runner and stays there until the next exhaust blowdown event. It may be desired to inject just enough air for the oxygen in the air to react with (e.g., oxidize) the unburnt hydrocarbons delivered to the exhaust runner. Further, air injection from the secondary air injection system may be timed to occur while the concentration of hydrocarbons in the exhaust runner(s) is expected to be the highest. Thus, the flow control valve opening timing may be set to be late in the exhaust stroke, after an exhaust valve opening timing of the corresponding cylinder. In some examples, the flow control valve closing timing may be set to be before an exhaust valve closing timing of the corresponding cylinder, while in other examples, the flow control valve closing timing may be set to be after or concurrent with the exhaust valve closing timing, as illustrated with respect to FIG. 6 and described below. Thus, the injection of the heated air may only occur late in the exhaust stroke of a cylinder, and not during an intake stroke, a compression stroke, or a power stroke of the cylinder. In other examples, the injection of the heated air may occur partially in the exhaust stroke of the cylinder and partially within the intake stroke. Additionally or alternatively, the injection of the heated air may occur substantially immediately after the blowdown exhaust pulse and for a limited duration.

As one example, the controller may estimate an amount of unburnt hydrocarbons that will be in the exhaust runner following the blowdown pulse and determine the duration of flow control valve opening that will deliver enough oxygen (via the heated air injection) to fully react with the unburnt hydrocarbons. In some examples, the controller may directly input relevant operating conditions for hydrocarbon output, such as one or more of the engine speed, MAP, MAF, the fuel injection amount and timing, the AFR, and the spark timing, as well as relevant operating conditions for the blowdown pulse timing, such as an exhaust valve cam timing setting, an exhaust valve variable valve lift setting, and an exhaust valve variable valve duration setting, into one or more look-up tables, algorithms, or maps, which may output the opening and closing timing of each flow control valve that is expected to fully react with the estimated amount of hydrocarbons predicted to be present in the exhaust runner following the blowdown pulse. As another example, the controller may make a logical determination (e.g., regarding the opening and closing timing of each flow control valve) based on logic rules that are a function of one or more of the engine speed, MAP, MAF, the fuel injection amount and timing, the AFR, the spark timing, the fuel injection timing, the fuel stratification, the exhaust valve cam timing setting, the exhaust valve variable valve lift setting, and the exhaust valve variable valve duration setting. Further, the opening and closing timings for each flow control valve may be reassessed each engine cycle and/or as the measured operating conditions change.

In one example, the controller may vary a mass flowrate of the air injection to be directly proportional to MAF, the mass flowrate of air through the engine, because a hydrocarbon emissions index of the engine is largely proportional to MAF. However, because the hydrocarbon emissions index varies somewhat with operating parameters such as exhaust valve timing, the controller may further take into account changes in those parameters to vary the air injection mass flowrate. Further, because the hydrocarbon concentration in the exhaust flow from the cylinder during a given cylinder's exhaust process is not uniform with respect to crank angle, in another example, the controller may modulate the flow of heated air as a function of the exhaust valve opening location or an offset of the air injector from the exhaust valve opening location to match the flow of the heated air to the hydrocarbon concentration.

At 514, method 500 includes opening and closing each flow control valve at the determined opening and closing timings to provide air to the air injector(s) of the corresponding cylinder. For example, the controller may send a first control signal to the corresponding flow control valve to fully open the flow control valve at the determined opening timing and send a second, different control signal (or remove the first control signal) to fully close the flow control valve at the determined closing timing. The flow control valve may remain fully closed until the next determined opening timing. Further, it may be understood that all of the flow control valves may remain closed until combustion is started within the engine. For example, the flow control valves may remain closed during cranking, and thus heated air may not be delivered to the exhaust runners until after a first combustion event in the engine.

At 515, method 500 includes injecting the air via the air injector(s) of the corresponding cylinder. In some examples, the air injector(s) may be continuously open to provide continuous flow to the exhaust runner while the corresponding flow control valve is open. In other examples, the air injector(s) may be actuated open for a duration after exhaust valve closing of the corresponding cylinder to allow oxygen in the injected heated air to mix and react with hydrocarbons in the final portion of the exhaust gases to leave the cylinder, which have a higher hydrocarbon concentration that the exhaust gases emitted during the blowdown pulse, for example. Thus, in some examples, the control of the flow control valve alone may determine the timing and amount of heated air injected into the exhaust runner of the corresponding cylinder, while in other examples, the control of both the flow control valve and the air injector(s) may determine the timing and amount of heated air injected into the exhaust runner of the corresponding cylinder. Method 500 may then end. For example, method 500 may be repeated at a predetermined frequency in order to inject heated air into the exhaust port of each cylinder while the cold start condition remains present.

Returning to 504, if the catalyst heating condition is not present, such as when the catalyst is already operating above its light-off temperature, method 500 proceeds to 516 and includes operating the engine at stoichiometry. As described above with respect to FIG. 2, operating the engine at stoichiometry may include alternating between rich and lean combustion events for an "average" operation at stoichiometry. Further, the engine may be operated with a spark timing determined to provide a desired engine torque output, for example.

At 518, method 500 includes not operating the air pump of the secondary air injection system. For example, the air pump may remain unpowered so that it does not draw in air through the intake passage. Thus, the air pump may remain at rest.

At 520, method 500 includes deactivating (or maintaining deactivated) the heating elements of the secondary air injection system. For example, the one or more heating elements may not be powered. This includes deactivating the heating elements that were activated in anticipation of an engine start and a cold start condition not being confirmed.

At 522 method 500 includes maintaining the flow control valve of each cylinder closed. As such, heated air will not be injected into the exhaust runner(s) of each cylinder via the secondary air injection system, as the output of unburnt hydrocarbons by the engine is relatively low when the engine is warm and operating at stoichiometry. Further, with the catalyst above its light-off temperature, the catalyst is able to effectively oxidize hydrocarbons in the feedgas. Method 500 may then end.

In this way, the secondary air injection system may selectively inject heated air into the exhaust runner of each cylinder when a high concentration of hydrocarbons is present within the exhaust runner, such as following a blowdown pulse of an exhaust stroke (e.g., a blowdown exhaust pulse). By injecting just enough heated air to react with the unburnt hydrocarbons, hydrocarbon emissions during warm-up may be reduced while an amount of time until the catalyst reaches its light-off temperature is also decreased.

In one example, the method may include a catalyst heating condition occurring, determining the catalyst heating condition is present, and in response thereto, injecting hot air into the exhaust port of a cylinder during an exhaust stroke of the cylinder; and the catalyst heating condition not occurring, determining the catalyst heating condition is not present, and in response thereto, not injecting the hot air. In some examples, injecting the hot air into the exhaust port of the cylinder during the exhaust stroke of the cylinder occurs while or during the catalyst heating condition and does not occur while the catalyst heating condition is not present. Further, instructions stored in memory may include determining the catalyst heating condition from one or more of an engine coolant temperature sensor and an exhaust temperature sensor, and in response, injecting the hot air by instructions for sending a first signal to a flow control valve positioned to control flow to an air injector coupled to the exhaust port; and determining the catalyst heating condition is not present, and in response, not injecting the hot air by instructions for sending a second, different signal to the flow control valve. For example, the first signal may open the flow control valve for a determined duration beginning during the exhaust stroke, after a blowdown exhaust pulse, and the second signal may maintain the flow control valve closed during an engine cycle, including during the exhaust stroke.

As illustrated by examples herein, the method of operating and performing actions responsive to a determination of the catalyst heating condition may include operating in the catalyst heating condition (e.g., commencing engine combustion while a temperature of the catalyst is less than a threshold temperature), determining whether that condition is present (such as based on sensor output from a temperature sensor) and performing actions in response thereto, as well as operating without that condition present, determining that the condition is not present, and performing a different action in response thereto. For example, the controller may operate heating elements and an air pump of a secondary air injection system responsive to the determination that the catalyst heating condition is present, and the controller may not operate the heating elements and the air pump of the secondary air injection system responsive to the determination that the catalyst heating condition is not present. As another example, the controller may operate the engine at a richer AFR when it is determined that the catalyst heating condition is present relative to when it is determined that the catalyst heating condition is not present.

Next, FIG. 6 shows an example set of graphs 600 of sequential hot secondary air injection locations and their timings in a four-cylinder engine. For example, the engine may be engine 10 of FIGS. 1 and 2, equipped with secondary air injection system 202. An exhaust flow rate into an exhaust runner of a first cylinder (e.g., cylinder 1) is shown in a plot 602, an exhaust flow rate into an exhaust runner of a second cylinder (e.g., cylinder 2) is shown in a plot 606, an exhaust flow rate into an exhaust runner of a third cylinder (e.g., cylinder 3) is shown in a plot 610, an exhaust flow rate into an exhaust runner of a fourth cylinder (e.g., cylinder 4) is shown in a plot 614. Further, the corresponding exhaust valve opening (EVO) and exhaust valve closing (EVC) timing is shown for each cylinder for each exhaust valve opening event. A position of a flow control valve that regulates a flow of the hot air into the exhaust runner of the corresponding cylinder is also shown as a dashed overlay on each plot. That is, a position of a first flow control valve that regulates the flow of the hot injected air into the exhaust runner of the first cylinder is shown in a dashed plot 604, a position of a second flow control valve that regulates the flow of the hot injected air into the exhaust runner of the second cylinder is shown in a dashed plot 608, a position of a third flow control valve that regulates the flow of the hot injected air into the exhaust runner of the third cylinder is shown in a dashed plot 612, and a position of a fourth flow control valve that regulates the flow of the hot injected air into the exhaust runner of the fourth cylinder is shown in a dashed plot 616.

For all of the above, the horizontal axis represents time, with time increasing along the horizontal axis from left to right. For plots 602, 606, 610, and 614, the exhaust flow rate into the corresponding exhaust runner increases up the vertical axis from 0. For dashed plots 604, 608, 612, and 616, the vertical axis represents the position of the corresponding flow control valve from a fully closed position ("closed") to a fully open position ("open"), as labeled. Further, in the example of FIG. 6, it may be understood that a first combustion event has already occurred during an engine cold start.

As illustrated by the set of graphs 600, each flow control valve of the secondary air injection system is pulsed open after a higher exhaust flow rate blowdown pulse is finished. The blowdown pulse is shown as a sharp spike in the exhaust flow rate that occurs upon exhaust valve opening, after which a more gradual exhaust flow rate increase occurs. For example, the corresponding flow control valve is opened during a slower, more prolonged exhaust flow from the cylinder into the runner that occurs as a piston within the cylinder rises and forces out additional exhaust gas. The corresponding flow control valve remains open until just before, just after, or at the same time as exhaust valve closing. Thus, as a duration that the exhaust valve is open decreases with respect to time, such as due to a speed of the engine increasing, a duration during which the corresponding flow control valve is open is decreased accordingly.

Next, FIG. 7 shows an example timeline 700 of operating parameters for providing secondary heated air injection into exhaust runners of an engine of a vehicle during a cold start. For example, the engine may be engine 10 shown in FIGS. 1 and 2, which includes secondary air injection system 202. Engine speed is shown in a plot 702, a temperature of a catalyst is shown in a plot 704, a status of an air heater is shown in a plot 706, a status of an air pump is shown in a plot 708, a pre-catalyst hydrocarbon concentration is shown in a plot 710, and an engine AFR is shown in a plot 712. For all of the above, the horizontal axis represents time, with time increasing along the horizontal axis from left to right. The vertical axis represents each labeled parameter. For plots 702, 704, and 710, a magnitude of the labeled parameter increases along the vertical axis from bottom to top. For plots 706 and 708, the vertical axis shows the state of the labeled component as "off" or "on." For plot 712, the engine AFR is shown with respect to a dashed line representing stoichiometry. AFR values greater than stoichiometry are lean, and AFR values less than stoichiometry are rich.

At time t0, the vehicle is off and at rest. The engine speed is zero (plot 702), as the engine is not operating while the vehicle is off. The temperature of the catalyst is relatively low (plot 704), such as equal to ambient temperature, and is less than a light-off temperature of the catalyst that is represented by a dashed line 714. Because the engine is off and not combusting, there is no engine AFR at time t0, and the pre-catalyst hydrocarbon concentration is very low (plot 710). Further, the air heater (plot 706) and the air pump (plot 708) are off.

At time t1, a controller determines that an engine start is imminent, such as due to a door of the vehicle being unlocked. In response, the air heater is powered on (plot 706) to start heating air within the secondary air injection system. For example, the air heater may be air heater 228 of FIG. 2 and/or heating elements positioned within air injectors coupled to each exhaust runner of the engine. The air heater may be powered on by supplying electrical power from a vehicle battery, for example.

At time t2, the engine is cranked during starting. The temperature of the catalyst (plot 704) is less than the light-off temperature (dashed line 714), indicating that a cold start condition is present. In response, the air pump is powered on (plot 708) to deliver pressurized air to a delivery passage of the secondary air injection system, where it may be heated by the hot air heater, for example.

At time t3, combustion commences in the engine, which is operated with a slightly rich AFR (plot 712) and at an idle speed (plot 702). As a result, the pre-catalyst hydrocarbon concentration (plot 710) begins to increase and peaks shortly after the engine is started. As described above with respect to FIGS. 5 and 6, hot air is injected into the exhaust runner of each cylinder of the engine late in the exhaust stroke of the cylinder. For example, a timing of each hot air injection event may be determined based on a plurality of operating parameters, including an opening and closing timing of the corresponding exhaust valve. The oxygen in the injected hot air reacts with unburnt hydrocarbons in the exhaust runner. As a result, the pre-catalyst hydrocarbon concentration is lower (plot 710) than if the secondary air injection system is not used, represented by a dashed segment 711. Further, the hot air helps warm the catalyst. As a result, the temperature of the catalyst (plot 704) reaches the light-off temperature (dashed line 714) at time t4. In comparison, if the secondary air injection system were not used to selectively inject the hot air into the exhaust runner of each cylinder, the temperature of the catalyst would increase more slowly, shown by a dashed segment 705, and would not reach the light-off temperature until time t5, which occurs later than time t4.

In response to the temperature of the catalyst (plot 704) reaching the light-off temperature (dashed line 714) at time t4, the cold start condition is no longer present. As a result, the air heater and the air pump are both turned off (plots 706 and 708, respectively), and the secondary air injection system is no longer used to inject hot, pressurized air into the exhaust runner of each cylinder. Further, the engine AFR is adjusted to stoichiometry (plot 712). At time t6, the engine speed increases (plot 702) above the idle speed as the vehicle is driven, which causes the temperature of the catalyst to further increase (plot 704). Further, because the engine is warm, the pre-catalyst hydrocarbon concentration is greatly reduced (plot 710).

In this way, by using the secondary injection of hot air in combination with operating the engine only slightly rich of stoichiometry, a quantity of unburned hydrocarbons that are delivered to the catalyst prior to the catalyst reaching its light-off temperature are reduced. By injecting hot air directly into the exhaust runner when hydrocarbons are present, the catalyst may reach its light-off temperature more quickly, after which it may more efficiently reduce exhaust emissions (e.g., by oxidizing the unburned hydrocarbons). As a result, overall vehicle emissions are reduced. Further, by operating at or near stoichiometry instead of using traditional enrichment during the warm-up, vehicle fuel economy may be increased. Further still, operating near stoichiometry enables a relatively small volume of air to be injected, which in turn allows the air to be heated to higher temperatures (e.g., 500° C.) than may be feasible than when larger volumes are injected (e.g., if traditional enrichment were used).

The technical effect of injecting hot air into an exhaust runner of each cylinder late in an exhaust stroke while operating the engine at or near stoichiometry during a cold start is that hydrocarbon emissions may be reduced.

As one example, a method comprises: during heating of a catalyst coupled in an exhaust system of an engine, injecting heated air into an exhaust runner of each cylinder of the engine after a blowdown exhaust pulse of the corresponding cylinder. In a first example of the method, the method further comprises: operating the engine at stoichiometry during the heating of the catalyst. In a second example of the method, optionally including the first example, the method further comprises: operating the engine at an air-fuel ratio (AFR) that is no more than 2% richer than stoichiometry during the heating of the catalyst. In a third example of the method, optionally including one or both of the first and second examples, injecting the heated air into the exhaust runner of each cylinder of the engine after the blowdown exhaust pulse of the corresponding cylinder comprises opening a flow control valve positioned in a delivery passage between an air injector coupled to the exhaust runner of the corresponding cylinder and an air pump for a duration determined based on an estimated amount of unburned hydrocarbons in the exhaust runner. In a fourth example of the method, optionally including any or all of the first through third examples, injecting the heated air into the exhaust runner of each cylinder of the engine after the blowdown exhaust pulse of the corresponding cylinder comprises: opening a flow control valve positioned in a delivery passage between an air injector coupled to the exhaust runner of the corresponding cylinder and an air pump at an opening timing that occurs after an exhaust valve opening timing of the corresponding cylinder; and closing the flow control valve at a closing timing that occurs before, concurrent with, or after an exhaust valve closing timing of the corresponding cylinder. In a fifth example of the method, optionally including any or all of the first through fourth examples, the method further comprises: pressurizing the heated air in the delivery passage by operating the air pump. In a sixth example of the method, optionally including any or all of the first through fifth examples, the heated air is heated via one or more heating elements positioned downstream of the air pump. In a seventh example of the method, optionally including any or all of the first through sixth examples, the one or more heating elements include at least one of a centralized air heater positioned in the delivery passage, upstream of the flow control valve, and a heater positioned within the air injector, downstream of the flow control valve. In an eighth example of the method, optionally including any or all of the first through seventh examples, the method further comprises: activating the one or more heating elements prior to the heating of the catalyst responsive to an anticipation of starting the engine. In a ninth example of the method, optionally including any or all of the first through eighth examples, the heating of the catalyst is responsive to a temperature of the catalyst being less than a threshold temperature, and the method further comprises: in response to the temperature of the catalyst reaching the threshold temperature, discontinuing injecting the heated air into the exhaust runner of each cylinder of the engine after the blowdown exhaust pulse of the corresponding cylinder.

As another example, a method comprises: activating a heating element of a secondary air injection system responsive to an indication of an anticipated cold start of an engine; in response to the anticipated cold start occurring, performing sequential injections of hot air into an exhaust runner of each cylinder of the engine via the secondary air injection system; and in response to the anticipated cold start not occurring, deactivating the heating element and not performing the sequential injections of the hot air. In a first example of the method, the secondary air injection system includes a branched air passage system, each branch of the branched air passage system fluidically coupling an air delivery passage to the exhaust runner of one cylinder of the engine and including a flow control valve positioned therein, and performing the sequential injections of the hot air into the exhaust runner of each cylinder of the engine via the secondary air injection system comprises: heating the hot air to at least a pre-determined desired temperature via the heating element; opening the corresponding flow control valve after a blowdown exhaust pulse of the corresponding cylinder at an opening timing determined based on at least an exhaust valve setting of the corresponding cylinder; and injecting the hot air via an air injector directly coupled to the exhaust runner and the corresponding branch of the branched air passage system. In a second example of the method, optionally including the first example, the method further comprises: closing the corresponding flow control valve at a closing timing determined based on at least the exhaust valve setting of the corresponding cylinder. In a third example of the method, optionally including one or both of the first and second examples, the exhaust valve setting of the corresponding cylinder includes one or more of an exhaust valve cam timing setting, an exhaust valve variable valve lift setting, and an exhaust valve variable valve duration setting. In a fourth example of the method, optionally including any or all of the first through third examples, the method further comprises: in response to the anticipated cold start occurring, operating an air pump of the secondary air injection system, the air pump positioned upstream of the heating element, to provide pressurized air to the branched air passage system, and wherein the pressurized air is heated via the heating element.

As still another example, a system comprises: an engine including a plurality of cylinders, each cylinder including an exhaust valve positioned to control flow from the corresponding cylinder to an exhaust port; a secondary air injection system including a branched air passage system, an air pump, at least one heater, an air injector directly coupled to each exhaust port and the branched air passage system, and a plurality of flow control valves positioned within the branched air passage system; and a controller including executable instructions stored in non-transitory memory that, when executed, cause the controller to: during a cold start condition, open each flow control valve of the plurality of flow control valves after a blowdown exhaust pulse of the corresponding cylinder for a duration determined based on an estimated amount of unburned hydrocarbons in the exhaust port; and when the cold start condition is not present, maintain each flow control valve of the plurality of flow control valves closed throughout an engine cycle. In a first example of the system, the controller includes further instructions stored in non-transitory memory that, when executed, cause the controller to: during the cold start condition, operate the air pump to provide pressurized air to the branched air passage system and operate the at least one heater to heat the pressurized air before injecting the pressurized air into each exhaust port via the air injector coupled thereto. In a second example of the system, optionally including the first example, each flow control valve of the plurality of flow control valves is positioned in an air delivery passage of the branched air passage system that fluidically couples the air injector of one cylinder of the plurality of cylinders to the air pump, and wherein opening each flow control valve of the plurality of flow control valves enables pressurized air to flow to the corresponding air injector. In a third example of the system, optionally including one or both of the first and second examples, the controller includes further instructions stored in non-transitory memory that, when executed, cause the controller to: during the cold start condition, operate the engine at an air-fuel ratio that is approximately equal to stoichiometry. In a fourth example of the system, optionally including any or all of the first through third examples, the system further comprises an emission control device coupled in an exhaust passage of the engine, downstream of the exhaust port of each cylinder, and wherein the cold start condition is present when a temperature of the emission control device is less than a threshold temperature, and the cold start condition is not present when the temperature of the emission control device is greater than the threshold temperature.

In another representation, a method comprises: injecting heated air into an exhaust runner of a cylinder of an engine when a temperature of a catalyst coupled to an exhaust system of the engine is less than a threshold temperature. In a first example of the method, injecting the heated air into the exhaust runner of the cylinder of the engine when the temperature of the catalyst is less than the threshold temperature comprises: selectively opening a flow control valve during a portion of a combustion cycle of the cylinder, the flow control valve positioned in an air delivery passage fluidically coupling an air pump to the exhaust runner. In a second example of the method, optionally including the first example, selectively opening the flow control valve comprises: opening the flow control valve immediately following a blowdown exhaust pulse of the cylinder; and closing the flow control valve after a determined duration. In a third example of the method, optionally including one or both of the first example and the second example, the determined duration is determined based on an estimated amount of hydrocarbons in the exhaust runner immediately following the blowdown exhaust pulse of the cylinder. In a fourth example of the method, optionally including any or all of the first through third examples, injecting the heated air into the exhaust runner of the cylinder of the engine when the temperature of the catalyst is less than the threshold temperature further comprises: activating a heating element positioned in the air delivery passage between the air pump and the flow control valve. In a fifth example of the method, optionally including any or all of the first through fourth examples, injecting the heated air into the exhaust runner of the cylinder of the engine when the temperature of the catalyst is less than the threshold temperature further comprises: activating a heating element positioned downstream of the flow control valve. In a sixth example of the method, optionally including any or all of the first through fifth examples, injecting the heated air into the exhaust runner of the cylinder of the engine when the temperature of the catalyst is less than the threshold temperature further comprises: activating a heating element positioned in an air injector directly coupled to the exhaust runner and the air delivery passage. In a seventh example of the method, optionally including any or all of the first through sixth examples, injecting the heated air into the exhaust runner of the cylinder of the engine when the temperature of the catalyst is less than the threshold temperature further comprises: operating the air pump at a speed determined to generate air of a desired pressure upstream of the flow control valve. In an eighth example of the method, optionally including any or all of the first through seventh examples, the threshold temperature is a light-off temperature of the catalyst.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations, and/or functions may be repeatedly performed depending on the particular strategy being used. Further, the described actions, operations, and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. Moreover, unless explicitly stated to the contrary, the terms "first," "second," "third," and the like are not intended to denote any order, position, quantity, or importance, but rather are used merely as labels to distinguish one element from another. The subject matter of the present disclosure includes all novel and non-obvious combinations and sub-combinations of the various systems and configurations, and other features, functions, and/or properties disclosed herein.

As used herein, the term "approximately" is construed to mean plus or minus five percent of the range unless otherwise specified.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method, comprising:
   during heating of a catalyst coupled in an exhaust system of an engine, injecting heated air into an exhaust runner of each cylinder of the engine after a blowdown exhaust pulse of the corresponding cylinder; and
   operating the engine at stoichiometry during the heating of the catalyst.

2. The method of claim 1, further comprising additionally operating the engine at an air-fuel ratio (AFR) that is no more than 2% richer than stoichiometry during the heating of the catalyst.

3. The method of claim 1, wherein injecting the heated air into the exhaust runner of each cylinder of the engine after the blowdown exhaust pulse of the corresponding cylinder comprises opening a flow control valve positioned in a delivery passage between an air injector coupled to the exhaust runner of the corresponding cylinder and an air pump for a duration determined based on an estimated amount of unburned hydrocarbons in the exhaust runner.

4. The method of claim 1, wherein injecting the heated air into the exhaust runner of each cylinder of the engine after the blowdown exhaust pulse of the corresponding cylinder comprises:
   opening a flow control valve positioned in a delivery passage between an air injector coupled to the exhaust runner of the corresponding cylinder and an air pump at an opening timing that occurs after an exhaust valve opening timing of the corresponding cylinder; and
   closing the flow control valve at a closing timing that occurs before, concurrent with, or after an exhaust valve closing timing of the corresponding cylinder.

5. The method of claim 4, further comprising pressurizing the heated air in the delivery passage by operating the air pump.

6. The method of claim 4, wherein the heated air is heated via one or more heating elements positioned downstream of the air pump.

7. The method of claim 6, wherein the one or more heating elements include at least one of a centralized air heater positioned in the delivery passage, upstream of the flow control valve, and a heater positioned within the air injector, downstream of the flow control valve.

8. The method of claim 6, further comprising activating the one or more heating elements prior to the heating of the catalyst responsive to an anticipation of starting the engine.

9. The method of claim 1, wherein the heating of the catalyst is responsive to a temperature of the catalyst being less than a threshold temperature, and the method further comprises:
   in response to the temperature of the catalyst reaching the threshold temperature, discontinuing injecting the heated air into the exhaust runner of each cylinder of the engine after the blowdown exhaust pulse of the corresponding cylinder.

10. A method, comprising:
    activating a heating element of a secondary air injection system responsive to an indication of an anticipated cold start of an engine;
    in response to the anticipated cold start occurring, performing sequential injections of hot air into an exhaust runner of each cylinder of the engine via the secondary air injection system; and
    in response to the anticipated cold start not occurring, deactivating the heating element and not performing the sequential injections of the hot air.

11. The method of claim 10, wherein the secondary air injection system includes a branched air passage system, each branch of the branched air passage system fluidically coupling an air delivery passage to the exhaust runner of one cylinder of the engine and including a flow control valve positioned therein, and performing the sequential injections of the hot air into the exhaust runner of each cylinder of the engine via the secondary air injection system comprises:
    heating the hot air to at least a pre-determined desired temperature via the heating element;
    opening the corresponding flow control valve after a blowdown exhaust pulse of the corresponding cylinder at an opening timing determined based on at least an exhaust valve setting of the corresponding cylinder; and
    injecting the hot air via an air injector directly coupled to the exhaust runner and the corresponding branch of the branched air passage system.

12. The method of claim 11, further comprising closing the corresponding flow control valve at a closing timing determined based on at least the exhaust valve setting of the corresponding cylinder.

13. The method of claim 11, wherein the exhaust valve setting of the corresponding cylinder includes one or more of an exhaust valve cam timing setting, an exhaust valve variable valve lift setting, and an exhaust valve variable valve duration setting.

14. The method of claim 11, further comprising, in response to the anticipated cold start occurring, operating an air pump of the secondary air injection system, the air pump positioned upstream of the heating element, to provide pressurized air to the branched air passage system, and wherein the pressurized air is heated via the heating element.

15. A system, comprising:
    an engine including a plurality of cylinders, each cylinder including an exhaust valve positioned to control flow from the corresponding cylinder to an exhaust port of an exhaust system;

a secondary air injection system including a branched air passage system, an air pump, at least one heater, an air injector directly coupled to each exhaust port and the branched air passage system, and a plurality of flow control valves positioned within the branched air passage system;

a catalyst coupled in the exhaust system; and a controller including executable instructions stored in non-transitory memory that, when executed, cause the controller to:

activate the heater of the secondary air injection system responsive to an indication of an anticipated cold start condition of an engine;

during the cold start condition, open each flow control valve of the plurality of flow control valves after a blowdown exhaust pulse of the corresponding cylinder for a duration determined based on an estimated amount of unburned hydrocarbons in the exhaust port to inject heated air, including sequential injections of hot air into an exhaust runner of each cylinder of the engine via the secondary air injection system;

operate the engine at an air-fuel ratio that is approximately equal to stoichiometry; and when the cold start condition is not present, deactivating the heating element and not performing the sequential injections of the hot air by maintaining each flow control valve of the plurality of flow control valves closed throughout an engine cycle.

16. The system of claim 15, wherein the controller includes further instructions stored in non-transitory memory that, when executed, cause the controller to:

during the cold start condition, operate the air pump to provide pressurized air to the branched air passage system and operate the at least one heater to heat the pressurized air before injecting the pressurized air into each exhaust port via the air injector coupled thereto.

17. The system of claim 16, wherein each flow control valve of the plurality of flow control valves is positioned in an air delivery passage of the branched air passage system that fluidically couples the air injector of one cylinder of the plurality of cylinders to the air pump, and wherein opening each flow control valve of the plurality of flow control valves enables pressurized air to flow to the corresponding air injector.

18. The system of claim 15, further comprising an emission control device coupled in an exhaust passage of the engine, downstream of the exhaust port of each cylinder, and wherein the cold start condition is present when a temperature of the emission control device is less than a threshold temperature, and the cold start condition is not present when the temperature of the emission control device is greater than the threshold temperature.

* * * * *